United States Patent
Haynes et al.

(10) Patent No.: US 9,762,560 B2
(45) Date of Patent: Sep. 12, 2017

(54) METHOD FOR GENERATING CRYPTOGRAPHIC "ONE-TIME PADS" AND KEYS FOR SECURE NETWORK COMMUNICATIONS

(71) Applicant: Aclara Technologies LLC, Hazelwood, MO (US)

(72) Inventors: David Haynes, Hazelwood, MO (US); Glenn Emelko, Hazelwood, MO (US)

(73) Assignee: Aclara Technologies LLC, St. Louis, MO (US)

( * ) Notice: Subject to any disclaimer, the term of this patent is extended or adjusted under 35 U.S.C. 154(b) by 195 days.

(21) Appl. No.: 14/933,533

(22) Filed: Nov. 5, 2015

(65) Prior Publication Data
US 2016/0149879 A1    May 26, 2016

Related U.S. Application Data

(60) Provisional application No. 62/084,120, filed on Nov. 25, 2014.

(51) Int. Cl.
*H04L 9/32* (2006.01)
*H04L 29/06* (2006.01)
(Continued)

(52) U.S. Cl.
CPC ............ *H04L 63/067* (2013.01); *G09C 5/00* (2013.01); *H04L 9/0822* (2013.01);
(Continued)

(58) Field of Classification Search
CPC ... H04L 63/067; H04L 63/062; H04L 63/838; H04L 9/3228; G06F 9/4416
(Continued)

(56) References Cited

U.S. PATENT DOCUMENTS 7,430,670 B1    9/2008  Horning et al.
7,779,270 B2    8/2010  Horning et al.
(Continued)

OTHER PUBLICATIONS

H. R. M. H. Hamid and N. Y. Abdullah, "Physical Authentication Using Random Number Generated (RNG) Keypad Based on One Time Pad (OTP) Concept," 2015 Fourth International Conference on Cyber Security, Cyber Warfare, and Digital Forensic (CyberSec), Jakarta, 2015, pp. 135-139, Oct. 29-31, 2015.*

(Continued)

*Primary Examiner* — Evans Desrosiers
*Assistant Examiner* — Vu V Tran
(74) *Attorney, Agent, or Firm* — Polster, Lieder, Woodruff & Lucchesi, LC

(57) ABSTRACT

A method of generating random and pseudo-random material which is incorporated in devices located at each end of a communications network for secure communications through a channel of the network. The material is used to generate time based one-time pads, one-time keys, and the keys themselves. The one-time pads, one-time keys, and the keys support a key-based or pad based cryptographic technique employed to produce secure communications of messages transmitted through the channel with a one-time pad, one-time key, or a key generated at one interval of time being different and unique from a one-time pad, one-time key, or a key generated at any other interval of time.

8 Claims, 2 Drawing Sheets

(51) Int. Cl.
*G09C 5/00* (2006.01)
*H04L 9/08* (2006.01)

(52) U.S. Cl.
CPC ........ *H04L 9/0866* (2013.01); *H04L 63/0435* (2013.01); *H04L 63/062* (2013.01); *H04L 63/0823* (2013.01)

(58) Field of Classification Search
USPC ........................................................ 713/170
See application file for complete search history.

(56) References Cited

U.S. PATENT DOCUMENTS

| | | | |
|---|---|---|---|
| 7,779,394 | B2 | 8/2010 | Horning et al. |
| 7,823,135 | B2 | 10/2010 | Horning et al. |
| 8,387,022 | B2 | 2/2013 | Horning et al. |
| 8,468,244 | B2 | 6/2013 | Redlich et al. |
| 8,670,560 | B2 | 3/2014 | Cheddad et al. |
| 9,064,099 | B2 | 6/2015 | Horning et al. |
| 2003/0149869 | A1* | 8/2003 | Gleichauf ............... H04L 45/50 713/153 |
| 2007/0234070 | A1 | 10/2007 | Horning et al. |
| 2010/0211787 | A1* | 8/2010 | Bukshpun ............ H04L 9/0838 713/170 |
| 2010/0250497 | A1 | 9/2010 | Redlich et al. |
| 2015/0278491 | A1 | 10/2015 | Horning et al. |
| 2015/0288517 | A1* | 10/2015 | Evans .................. H04L 9/0883 713/168 |

OTHER PUBLICATIONS

Y. Mao, L. Cao and W. Liu, "Design and FPGA Implementation of a Pseudo-Random Bit Sequence Generator Using Spatiotemporal Chaos," 2006 International Conference on Communications, Circuits and Systems, Guilin, 2006, pp. 2114-2118.*

* cited by examiner

| Size of MacTag (bits) | Chance of a random number (noise) matching the MacTag |
|---|---|
| 8 | 1:256 |
| 16 | 1:65,536 = 15.2 parts per million |
| 24 | 1:16,777,216 = 59.6 parts per billion |
| 32 | 1:4,294,967,296 = 232.8 parts per trillion |
| 40 | $1:2^{40}$ = 909 parts per quadrillion ($10^{15}$) |
| 64 | $1:2^{64}$ = 54 parts per sextillion ($10^{24}$) |
| 128 | $1:2^{128}$ = 2.9 parts per $10^{39}$ |

| Input bits | Output |
|---|---|
| 00 | No output. |
| 01 | Output "0" bit. |
| 10 | Output "1" bit. |
| 11 | No output. |

METHOD FOR GENERATING CRYPTOGRAPHIC "ONE-TIME PADS" AND KEYS FOR SECURE NETWORK COMMUNICATIONS

CROSS REFERENCE TO RELATED APPLICATIONS

This is a U.S. non-provisional application that claims priority to and the benefit of U.S. Provisional Application 62/084,120, filed Nov. 25, 2014.

STATEMENT REGARDING FEDERALLY SPONSORED RESEARCH OR DEVELOPMENT

N/A

BACKGROUND OF THE INVENTION

This invention relates to the generation and encryption of communications, their transmission over a communications network, and the receipt and decryption of the messages sent; and, more particularly, to the creation and use of "one-time pads", one-time keys, and the keys themselves, in support of key-based cryptographic techniques used for such purposes.

An expectation of communications network users is the privacy of their communications sent over the network. One way of achieving privacy is cryptographic protections afforded a user for any information and data they send. It has been found that most forms of encryption are vulnerable to discovery through the use of various techniques; for example, frequency analysis by which multiple communications employing the same coding scheme are analyzed to locate more commonly used letters of the alphabet, combinations of letters, words, etc. Using these techniques, almost any coding scheme is ultimately decipherable by a third party not privy to the communications encrypted using the scheme.

There is, however, a form of encryption referred to as a "one-time pad" which is unbreakable. A one-time pad, as its name implies, is a coding scheme in which a cipher ("pad") is only used once to encrypt and decrypt a message, and then is discarded and not used again. After the message is sent, a new one-time pad is used for the next message after which it is also discarded, and so forth. Since only one communication is encoded using the particular coding scheme involving a pad, there is no volume of messages encrypted with the same coding scheme on which frequency analysis and other techniques can be used to uncover the underlying code and decipher messages sent using it.

While impregnable in protecting communications from discovery, this form of cryptography has fallen into disuse. This is because of the difficulties involved in generating, disseminating, and protecting the large volume of material required to produce a one-time pad or a series of one-time pads and their underlying keys (a key being a mutually agreed upon "secret" known to both the sender and receiver of a message). One reason for this is that the material generated to serve as a one-time pad or key must have a high degree of randomness which heretofore has not been readily achievable.

BRIEF SUMMARY OF THE INVENTION

The present invention is directed to a method of generating one-time pads, one-time keys, as well as the keys themselves to support key-based cryptographic communications. The use of these provides a basis for secure communications between two parties. Using the method, a substantial volume of randomly or pseudo-randomly generated material is generated and incorporated into devices installed in a communications system or network, for example, in a meter used by an electrical utility or the like.

In accordance with the invention, each device includes a ROM image embedded in it and which is a repository of the material. The ROM image is several kilobytes (Kb) in size, and contains both microcomputer instructions and numeric values. The size and content of a binary executable firmware image, instructions, and the numeric values it contains are kept as a "secret" starting at the factory where the device is produced and continuing throughout its use in a communications network until the device is ultimately replaced and/or destroyed. During use, the secret is combined with other "secrets" which are, for example, similar binary executable images embedded in other devices and used to confirm the owner of the device, the originator of the code, and a unique, secret identification (ID) number.

A time-based randomization process utilizes the secrets and enables the same, or different, pseudo-random sequences to be simultaneously generated by all the devices in a communications network having the same image. Using material drawn from the binary executable image embedded in a device at one end of a communication channel, together with material derived from the image embedded in a similar device at the other end of the channel, enables the message's sender and receiver to generate identical symbol sequences. These symbols can be used to form a one-time pad or they can be used as keys in a more conventional cryptographic technique. This method both rapidly and dynamically results in secure communications using a minimum length public key and, importantly, the parties do not have to exchange any private keys in order to facilitate secure communications. Accordingly, the parties can now exchange messages having "unbreakable" cryptographic security.

A large number, or "lifetime" supply, of pseudo-random codes may be generated by the devices noted above with the only way a third party may break the security being to physically acquire a unit, break into it, and acquire the secret information stored on the ROM installed in the device and on which the image is stored. This is not only costly, but also only succeeds in compromising communications until certificates of the secret are replaced throughout the network. Therefore, even if a unit is compromised, the effect is only temporary and the other units employed in the system are not entirely or permanently compromised.

Other objects will be in part apparent and in part pointed out hereinafter.

BRIEF DESCRIPTION OF THE SEVERAL VIEWS OF THE DRAWINGS

The accompanying figures which, together with the detailed description that follows, form part of the specification and illustrate the various embodiments described in the specification.

Corresponding reference characters indicate corresponding parts throughout the several views of the drawings.

DETAILED DESCRIPTION OF INVENTION

Figures 1, 2:
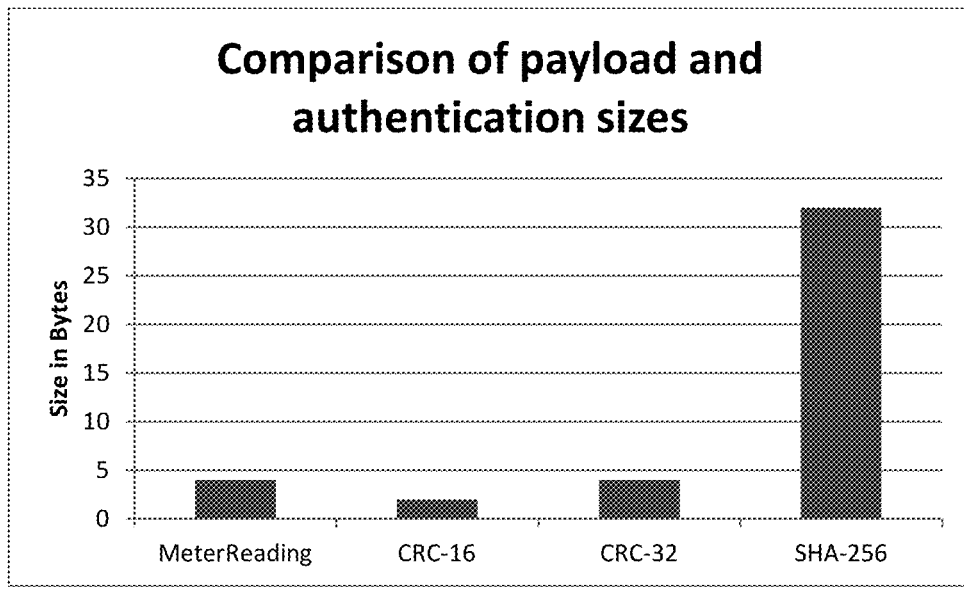
FIG. 1 is a chart comparing payload and error detection code lengths.
FIG. 2 is a table showing levels of protection afforded by MACs of different lengths.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

In the Description which follows, the following terminology is used.

Automatic Meter Infrastructure (AMI): A component of the "smart grid" which reads meters at least once an hour, and communicates two-way with metering endpoints.

Commercial-Off-The-Shelf (COTS): Hardware available as a commodity from numerous vendors.

Digital Signatures: Used to provide assurance of origin authentication and data integrity. Assurances are sometimes extended to provide assurance that a party in a dispute (the signatory) cannot repudiate or refute the validity of the signed document (i.e., also referred to as non-repudiation). Approved digital signature algorithms include digital signature algorithms (DSA), elliptic curve digital signature algorithms (ECDSA) and Rivest, Shamir, Adelman public key cryptosystems (RSA).

Encryption: A cryptographic operation used to provide confidentiality for sensitive information; decryption is the inverse operation. Several algorithms are currently approved for encryption by the Federal government including triple data encryption standards (DES) and advanced encryption standards (AES).

Hash: A transformation function that converts a variable length input to a fixed length string called the hash value. A cryptographically secure hash function maps an arbitrary-length input into a fixed-length output (the hash value) such that (a) it is computationally infeasible to find an input that maps to a specific hash value, and (b) it is computationally infeasible to find two inputs that map to the same hash value.

Key agreement: A technique used to establish symmetric keys between two entities that intend to communicate and in which both parties contribute information to the key agreement process. Two families of key agreement schemes are defined and have been approved: Diffie-Hellman (DH) and the Menezes-Qu-Vanstone (MQV) authentication protocol.

Key transport: A key establishment technique in which only one party determines the key.

Key wrapping: Encryption of a symmetric key by another symmetric key with integrity protection.

Message Authentication Code (MAC): A cryptographic checksum used to detect intentional modifications and errors in an encrypted record and which cannot be efficiently forged without knowledge of the cryptographic key used in the MAC algorithm.

MAC Address: A globally unique number usually assigned by a manufacturer during the manufacturing process and which uniquely identifies a communication board within a media access control layer of a network.

One-Time Private Key (OTPK): A key that is used only one time in conjunction with some well-established cryptography method, NIST: National Institute of Standards and Technology.

Security Appliance: A hardware device dedicated to encrypting/decrypting and authenticating messages. The appliance has no user-seviceable parts inside it. The appliance executes no algorithms other than those algorithms installed during its manufacture factory.

In a communications system such as one provided by a two-way communications system such as the TWACS® used in electric or other utility applications, message security is implemented by a combination of encryption and authentication. The levels of these are appropriate for the particular communications being protected. Encryption is used to hide the contents of a message (information and data); while, authentication provides assurance to one receiving a message that it was sent by the claimed sender. Thus, authentication is intended to verify (with a low probability of error) that the message received is a) sent from the claimed sender; b) is delivered without "accidental" alteration; and c) has not been tampered with.

Encryption typically does not add to the length of a message, but authentication usually does. A MAC, which can be public, accompanies the message and is used to insure the message comes from its claimed source. A typical MAC is derived from a cryptographic process involving protected fields within the message, as well as one or more "secrets" known only to the sender and receiver. Guarding these secrets and protecting them from discovery by a third party is a challenge. A secret is often a "private key" used in the cryptographic process that performs encryption or authentication. As is well-known in the art, elaborate safe guards have been developed for key management which, together with certificate management, is used to prove the identity of the various communicating parties. Size of a MAC is a function of both the protected fields and the secrets from which the MAC is derived and, the size of a MAC can be a concern for an AMI system.

To ensure a sender is who they claim they are, it is common practice, as noted above, for the sender and receiver to agree upon a common "secret" code on which their communication is based. In commercial communication systems, secrets are incorporated in firmware which is then embedded in a device (security appliance) installed in the system. As such, the secret needs protection during the entire lifespan of the device in which it is embedded; that is, from the time of its manufacture, through its installation and use, until it is ultimately replaced. This can include, for example, demonstrating that any firmware incorporating the secret comes from an authorized developer, and that the device or equipment in which the firmware is embedded is possessed by a legitimate system customer or user. If, for example, all the devices in which a secret is embedded are manufactured to use the same key(s), discovery of one key can compromise all the devices sharing that key. Were this to happen, in some instances use of a temporary key can minimize any resulting system vulnerability.

TWACS® employs utility meters such as "smart" meters to which outbound messages are sent from a central location, and from which inbound messages are sent back to that location. A meter reading is typically 4 bytes in size. See FIG. 1. The message content may be matched with a CRC-16 or similarly sized error detection field. However, commonly approved NIST security measures require 256 to 1024 bits of information. As such, recommended security measures dwarf what is typically protected in smart-metering applications. Further, many AMI systems are built to carry 0.5 to 1 bits/second/meter and applying a large MAC to all the traffic on a network can become a problem. Since many networks are cost optimized; i.e., they are sized for the traffic carried over them, a huge increase in the size of the traffic routed over them becomes difficult to support.

Some type of "key transport" and/or "key agreement" scheme is required to deliver a key having a required security strength. Usually a key delivery mechanism must have at least as many bits of security as the key it protects. NIST SP 800-131A describes the security for RSA-based transport as requiring key lengths of 2048 bits or longer, this requirement beginning in 2014. Similarly, DH and MQV schemes require that |p|=2048 bits, and |q|=224 or 256 bits.

NIST SP 800-107 explains that when the MAC is computed, a "full sized" key (such as 224 bits) is required, but that for "a low bandwidth channel or a desired high efficiency computation application such as audio or video casting application might use 32-bit MacTags." This involves computing the MAC using a full length key with the information and data (i.e., payload) to be protected using a predefined algorithm, then truncating the MacTag transmitted to a manageable size (e.g. 4 bytes).

By use of a full sized key, concerns over the identity of the sender can be addressed. This is particularly true if the key is never reused (i.e. a one-time key.) The issue then becomes the number of bits required in the MacTag to achieve the desired level of assurance that the message is not "noise" or is not otherwise "corrupted." See FIG. 2. In this regard, it has been found that a three or four byte value offers the level of protection necessary for AMI applications.

A one-time pad (OTP) is considered unbreakable if used correctly. In the method of the present invention, a random stream of characters is created as a "secret", and this secret is shared between the sender and receiver of a message. A shared secret is also referred to as a shared pattern. A method for creating a shared secret between two parties is described in co-pending application 62/084,120 which is assigned to the same assignee as the present application.

In accordance with the method of this invention, a sender alters each character of their message by drawing upon characters from the shared pattern. The receiver of the message then decrypts it using a reverse process involving the shared pattern. This shared pattern is then never used again. Rather, each subsequent message now requires use of a new shared pattern.

It will be understood by those skilled in the art that the challenge in using the method of the invention is in first developing a viable random pattern, and then keeping copies of the shared pattern a secret. Because of previous difficulties in keeping a shared pattern a secret, OTPs have not been widely used. However, the importance of an OTP is that it is currently the only known unbreakable cypher. It is also important because advances in computing equipment and processes have no effect on deciphering it and this sets it apart from all other current cryptographic techniques. Further, while OTPs are useful for encryption of messages, in some instances their greatest usefulness is for authentication rather than encryption. Importantly, the method described herein is useful for both the generation of one-time keys as well as one-time pads.

It will further be understood by those skilled in the art that the method of the invention facilitates secure communications in a variety of scenarios. These scenarios include communications from one person to one person; from one person to many persons; for many persons to one person; and from many persons to many persons.

Any conventional (i.e., NIST approved) cryptographic method that requires a private key can be used for message encryption and authentication. Such keys are typically used for extended periods without being changed; it being understood, however, that a frequent key change enhances security. This then raises the question as to why not continually change keys, or use a different key for each message. The reason is that doing so creates huge key administration issues. But, if there is sufficient hardware in place at each end of a transmission channel to generate the keys, these administration issues are significantly reduced.

A firmware image created by a developer is installed in a microcomputer during a device's manufacture. From the previous discussion, those skilled in the art will understand that the developer maintains the executable code established in the firmware of a device a "secret", and the design of the devices ensures this. Also, microcomputers installed in the devices have sufficient on-board RAM and ROM so that the randomly or pseudo-randomly generated material (data) used in producing an OTP or key never leaves a chip, and pins on the chip never expose the program executed in producing the OTP. That is, if someone has a programmed chip in their possession, and code protection is enabled for the chip, the chip will work, but the code and data it uses remain hidden. The hidden code will be inaccessible to all but the most sophisticated invasive physical attacks. For example, someone having physical possession of the chip could burn away its plastic packaging using a suitable acid, and then connect to the chip to die pads using microscopic equipment. Doing so might then make it possible to access data on the chip. To make this type of attack even more difficult, the chip is designed with security in mind such that the die itself is mounted within the device on a substrate that will crack if tampered with, and it is encased in a package not easily dissolved. Also, the production version of the chip will not have a programmer's debugging option which makes possible access to any data on it still further difficult.

It will be understood that one attacking the system will need data scattered throughout a ROM image and would therefore want to copy the entire image to ensure they have what they need. They will then need to run the chip and try to observe key production in action so as to determine what portion of a code is being executed. They will then have to reverse-assemble the code to determine the algorithm used. An attack such as described is both time consuming and costly, and if the information being protected does not justify the expense of the attack, it will probably not occur.

Heretofore, a device having, for example, 10 kB of useful ROM image will have a supply of 80 kB of material from which to draw. Assuming a message is 80 bits in length and an OTP is generated; then, for example, 1,024 messages can be encrypted/decrypted before the code index cycles around again and can be reused. If the algorithm were to step through the code and create a new key every second, it will take about 17 minutes before the system cycles around again to its starting location. The same source material would then be supplied to the algorithm and keys reused. Therefore, to continually create new keys during the life of the device, a more sophisticated generation function is required.

Figures 3, 4:
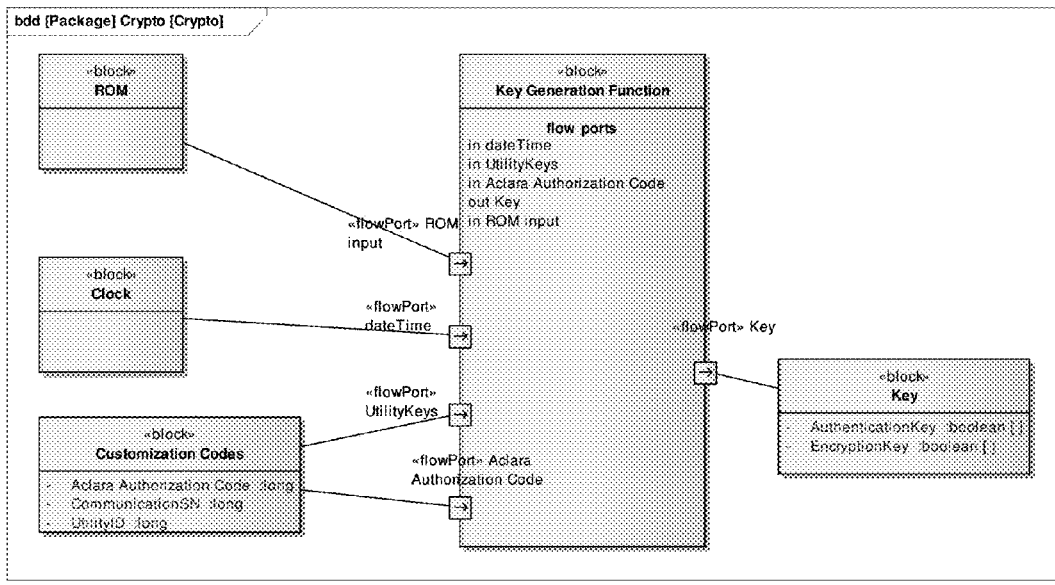
FIG. 3 is a block diagram illustrating the method of the invention.
FIG. 4 is a Von Neumann whitening chart.

Referring to FIG. 3, and in accordance with the method of the invention, time itself is used to create a mask which changes over time. This allows the OTP formation process to change dynamically, and deterministically, over the life of a device; and none of the keys created by the device keys are ever reused because the exact same time never recurs during the lifespan of that device. All devices having a given copy of firmware will have the same source material. If the same key generation algorithm is used in each of these devices, they will all generate the same keys provided their clocks are synchronized. Appendix A following this description sets forth the method of the invention.

In accordance with the method, a pointer is "walked" through a device's memory and selects bits according to a mask. This mask is shifted in accordance with a value relating to "time." Further, the starting point for the process is also time-variant. That is:

$$bitLocation=(time)mod(sizeOf(ROM)) \qquad (Eq. 1)$$

Using Equation 1, the starting location for the first bit of a bit group to be processed is calculated. In the equation time is a fixed value, possibly passed in the message, and expressed as the number of seconds since an epoch (e.g. 12:00 AM, Jan. 1, 1900); mod is the modulo operation; and the function sizeOf(ROM) indicates the size of a ROM memory space in bits. The modulus function ensures that the pointer stays within ROM boundaries. The process then looks to a mask to determine if bits can be used from the source material.

The selection of bits is governed by a mask which is computed as:

$$mask_{group}=time \oplus UserCertificate \oplus ProviderCertificate \qquad (Eq. 2)$$

wherein the UserCertificate is a value issued by a user that uniquely identifies the user and a ProviderCertificate is a value issued by the producer or provider of the device that certifies the source code as legitimate.

In Equation 2 for calculating a group-addressable mask, the UserCertificate is installed in a non-volatile (NV) memory of the device at the time of integration; and the ProviderCertificate is installed in the source code by the device provider at the time of compilation of the source code.

For individual addressing, a hash will also include a private serial number assigned to a device at its time of manufacture for the purpose of individualized communication. This number is then hashed with another unique number such as the device's MAC Address. Accordingly, an individually addressable mask is determined in Equation 3 as:

$$mask_{individual}=\oplus PrivateSerialNumber \oplus MacAddress \oplus UserCertificate \oplus ProviderCertificate \qquad (Eq. 3)$$

The pointer is now walked through the mask and examines it bit by bit. Based upon the bit value, the pointer directs the process to pull material from the ROM source material and process it to build up a key. The significance of the individually addressed mode means that even if an outside party were to discover a key, it only gives that party the key for just the one device. And, if this device is known to be missing from the network, it is presumed to be destroyed in the process of discovering the key and appropriate steps are immediately undertaken to preserve the integrity of the network's security.

Next, Von Neumann whitening can be applied to the bits before they are used in the key. Von Neumann whitening, which is supplied to successive bits in a bit steam, is shown in the table of FIG. 4. Applying this whitening process enhances the randomness of the bit stream. Those skilled in the art will appreciate that other methods of whitening can also be employed; for example, by using hashing algorithms.

Both authentication and encryption keys are usually needed at the same time. Even though both keys must be different, in accordance with the method of the invention, they are created at the same time. An efficient way to create both keys concurrently is to process mask bits as they are encountered. That is, when '1'0 is encountered it is used to build one key, and when a '0' is encountered it is used to build the other key. The two keys are then used, as appropriate, as the basis for encryption or authentication.

This approach is particularly advantageous where one vendor's equipment is being used to send a message to other equipment provided by the same vendor. This is because the binary image is now installed in code-protected chips at both ends of a communication's channel. If, as often occurs, messages are sent between equipment produced by different vendors, then more conventional cryptographic methods are required.

In applications where developers have elected to use cryptographic methods and key lengths that are not NIST approved for long-term use, the use of OTPs still provide value. This is because rapid generation of key material can offset concerns about the strength of short lived authentication keys. If a key's lifespan is limited to a short interval of time (e.g., a second), a new key will typically be in effect for the next message sent. Someone capturing a transmission may then spend considerable computing resources in an effort to decrypt the message, but ultimate derivation of the key will have no value for future communications.

OTP and OTPK methods require that both the sender and receiver possess a shared secret. The method described herein leverages the secret material in the end devices to derive a substantial number of individual keys which are protected by virtue of the hardware. As previously discussed, the secret material is contained within a code-protected chip. It will be understood by those skilled in the art that some chips are better than others for protecting the secrets incorporated in them. For example, vendors such as Texas Instruments (TI) and Freescale appear to have currently developed better code protection for the chips they produce than other vendors.

One issue in secure communications as described herein is how a participant at the other end of the communications channel will get the secret material necessary for encrypted communications. If the same vendor makes the devices used at each end of the channel, a source code image can be stored at both ends. In this circumstance, the secret image is stored in similar code-protected chips in the devices located at both ends of the channel. This then provides end-to-end security throughout the communications network. The devices could then transition to more commonly available security mechanisms for communication using other systems.

A security device will need to store considerable material in a secure manner. It can do so by keeping the material self-contained in a very large micro-computer chip. Or, it can store the image in an encrypted manner in NV memory and decrypt it only after it has been transferred into a secure volatile area where data is transferred between memory and a master control unit (MCU) without exposing it to pins where a logic analyzer could pick it up.

Because a significant number of similarly produced devices may be in use, they should each have vendor issued serial numbers and end-user issued property tags. Further, the loss or theft of any device creates a security concern which will probably result in all of the devices used throughout the network being rekeyed. This could, for example, be accomplished by changing the UserCertificate value. Whenever a security device appliance is withdrawn from service, its memory should be erased, or it should be physically destroyed.

Altogether, the method of the invention described herein generates pseudo-random numbers. It will be understood by those skilled in the art that to determine the degree of randomness sufficient for certain NIST or NSA applications will require extensive testing of the algorithm against a particular code base. It will further be understood that the frequency with which keys are changed is variable. One format is to change keys every day, but other key lifespans are contemplated. Execution of the method of the invention presupposes that the sender and receiver of messages can readily maintain the same time (within predetermined limits) with each other. In this regard, they will need to have some agreement as to how to process messages sent near time-change boundaries, and messages that span a time change boundary. One way of doing this would be to reference the start-time of the transmission, and include in the transmission a bit that toggles every day. The '1' or '0' bit would then indicate if the cryptography that prepared the message used "today's" key or "yesterday's" key.

The method of the invention also addresses one-way messages; i.e., those for which no response from the recipient are expected. While the above description has discussed the sender and recipient in two-way communications knowing which devices are used at each end of a communications channel, one-way ("blunt") messages can be problematic. This is because if there is a mixture of devices used on the network, a recipient may not necessarily know which code-source material was used to create the key employed. A way of addressing this issue is to have the message originator's ID be transmitted in the clear so that its firmware builder can be looked-up in an appropriate database; or allow the firmware's vendor ID be transmitted in the clear.

One potential application for the invention described herein is in hard-to-solve security situations. For example, if a system has no security already deployed in the field, how does one securely deliver keys to every relevant device employed in the system? I.e., how does one "bootstrap" system security? One way would be a firmware download in which the key is delivered as part of the download. But, a more secure approach is to leverage material already "hidden" in the devices themselves.

One application of the invention is, as noted, in the utility sector, but this is not the only area where security is needed. The strength of the OTP is its ability to perform secure cryptographic encoding of information. This capability is of great importance in financial and military applications. Accordingly, until a physically secure chip is developed, the greatest application of the method of the invention is to enhance the protection of low-cost, low-risk, time-aware, mass-produced, communication devices that are currently unprotected.

In view of the above, it will be seen that the several objects and advantages of the present disclosure have been achieved and other advantageous results have been obtained.

Appendix A—Psuedocode Description of Algorithm

Description: This algorithm leverages material already securely delivered to a device to develop new key material so that formal key exchanges do not need to occur. The algorithm is advantageous where the sending and receiving equipment is from the same manufacturer/vendor.

Inputs: The algorithm utilizes on-chip ROM material as a source for a bit pattern, and an integer value for "time" as a pseudo random number generator seed. The algorithm also incorporates producer and/or user issued certificates to provide uniqueness in the calculation process.

Outputs: The algorithm produces a pseudo-random number of a specified length. This number is then used as a OTP or as a secret key that can be used to secure communications.

Definitions:

Key, a mutually agreed upon "secret" which is known by both the sender and receiver of a message (i.e. the "private key").

MacAddress, a unique number installed in the device, and supplied by the manufacturer of the device running the code, to individually number it for network communication purposes at the Media Access Control protocol layer.

OTP, a pseudo-random number output by this routine. This value will appear to be a random number to third parties which do not have the inputs necessary to compute its value.

PrivateSerialNumber, a unique number installed in the device, and supplied by the manufacturer of the device running the code, to individually number it for warranty and control purposes.

ProducerCertificate, a value issued by the Producer that certifies the source code as legitimate.

Purpose, a value supplied to indicate the types of certificates that should be involved in creating the OTP.

RomMaterialStart, the lowest address in non-volatile memory which contains useful binary material.*

RomMaterialEnd, the highest address in non-volatile memory which contains useful binary material.*

*Note: "useful binary material" is ROM material which contains a mixture of 1's and 0's. All unused portions of ROM/EEPROM (ordinarily filled with 1's) are expected to be filled with random numbers. This helps maximize the size of the source material useful to the algorithm.

RgdPadLength, the required length in bits for the number output by the routine.

Time, an unsigned integer which counts the number of seconds since, for example, 12:00 AM, Jan 1, 1900. The value for "time" is supplied as part of the call to this routine and is considered a constant for the duration of the computation.*

**Note: Other epochs, sizes, and timekeeping systems may be utilized in an embodiment.

***Note: Some applications may require that "time" be sent in the clear along with the encrypted message. Other applications may be able to derive a suitable "time" value by other means.

UserCertificate, a value issued by the User or by the integrator which uniquely identifies the user.

Algorithm:

```
UsefulRomSize = RomMaterialEnd - RomMaterialStart;
% Set pointer which will advance through a memory drawing bits from the
% ROM source material and use it to build the OTP.
matlBitPtr = RomMaterialStart + (Time mod (UsefulRomSize));
% compute mask based upon a fixed input for time and supplied certificates
If (Purpose is for group communication)
    then
        mask = (Time XOR ProducerCertificate XOR UserCertificate);
    else
        mask = (Time XOR PrivateSerialNumber XOR MacAddress XOR
        ProducerCertificate XOR UserCertificate);
end
Place the mask in an array for easy access.
% initialize pointers
maskPos=0; %start at bit zero in mask
```

-continued

```
OTP = NULL; %initialize One Time Pad
PadLength = 0;
% build OTP
while(PadLength < RqdPadLength)
    if(bit identified within mask at maskPos equals '1')
        %use bit to build OTP
        repeat
            bit1 = bit identified by matlBitPtr;
            Advance matlBitPtr within RomMaterial one bit (and
                wrap if necessary);
            bit2 - bit identified by matlBitPtr within RomMaterial
                one bit (and wrap if necessary);
            twoBits = bit1 concatenated with bit2;
            %Employ VonNeumann whitening
            switch (twoBits)
                case '01': Add '0' to end of OTP and increment
                    PadLength;
                case '10': Add '1' to end of OTP and increment
                    PadLength;
                otherwise: Do nothing;
            endSwitchCase
        until (the loop is successful in adding a bit to the end of
            OTP)
    else
        %Do nothing
    endif
    Advance maskPos one position within the mask (and wrap to start of
        mask if necessary)
endwhile
```

Having thus described the invention, what is claimed and desired to be secured by Letters Patent is:

1. A secure method for generating random or pseudo-random material used to create one-time pads, one-time keys, and reusable private keys, the pads and/or the keys being used in a pad or key based cryptographic system for secure communications between at least two parties over a communications channel in which corresponding devices are installed at respective transmission and receiving ends of the channel for secure communications between the parties; the method comprising:

generating a computer based binary image comprising a plurality of data bits with each one-time pad being formed from said bits, the randomly and pseudo-randomly generated data bits being stored in a memory whose contents include the image;

selecting a bit group within the image for generating each one-time pad, selection of the group being time based so that the starting point within the binary image from which the group selected for each one-time pad is a function of an interval of time which is different than that for any other one-time pad that is generated, each one-time pad that is generated being used only once for the encryption and decryption of a single message and then discarded and not reused whereby the message produced by one party using the one-time pad and sent to the other party is not discernible by others; and, wherein a bit location in the binary image used as a starting point for producing the data bit group used to generate a one-time pad is determined as:

bitLocation=(time)mod(sizeOf(ROM))

where time is a fixed value expressed as the number of seconds since the beginning of a predetermined epoch; mod is a modulo operation; and sizeOf indicates the size of a ROM memory space in bits.

2. The method of claim 1 further including use of a mask to determine which data bits within the binary image can be used, the selection of bits determined by the mask being computed as:

$\text{mask}_{group}=\text{time} \oplus \text{UserCertificate} \oplus \text{ProviderCertificate}$ wherein the UserCertificate is a value that uniquely identifies a user of the method and a ProviderCertificate is a value issued by a producer or provider of a device in which the binary image is embedded together with a source code used to execute the method.

3. The method of claim 2 in which a UserCertificate is installed in a non-volatile memory of a device at the time of the device's manufacture; and the ProviderCertificate is installed in a source code implemented by the provider of the device at the time of compilation of the source code in the device.

4. The method of claim 1 further including performing a Von Neumann whitening of data produced for generating a one-time pad to enhance the randomness of the data used.

5. The method of claim 4 further including using hashing algorithms to enhance the randomness of the data used.

6. The method of claim 1 wherein the binary image is incorporated in a computer chip embedded in a device installed in at least one of a transmission end or a receiving end of a communications channel over which the message is sent.

7. The method of claim 2 further including simultaneously generating an encryption key and an authentication key for use with a message, the encryption key being generated when mask bits of one binary value are encountered, and the authentication key being generated when mask bits of the other binary value are encountered.

8. The method of claim 1 for communications between the following:
   one party to one party;
   one party to many parties;
   many parties to one party; and
   many parties to many parties.

* * * * *